US012261711B2

(12) United States Patent
Phillips et al.

(10) Patent No.: US 12,261,711 B2
(45) Date of Patent: Mar. 25, 2025

(54) AUTOMATED MEETING RECORDINGS AND REPLAY BASED ON USER ACTIVITY AND ATTENDANCE

(71) Applicant: Adeia Guides Inc., San Jose, CA (US)

(72) Inventors: Christopher Phillips, Hartwell, GA (US); Reda Harb, Issaquah, WA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/207,348

(22) Filed: Jun. 8, 2023

(65) Prior Publication Data

US 2024/0414018 A1 Dec. 12, 2024

(51) Int. Cl.
*H04L 12/18* (2006.01)

(52) U.S. Cl.
CPC ...... *H04L 12/1831* (2013.01); *H04L 12/1818* (2013.01)

(58) Field of Classification Search
None
See application file for complete search history.

(56) References Cited

U.S. PATENT DOCUMENTS

| | | | | |
|---|---|---|---|---|
| 2003/0217099 A1* | 11/2003 | Bobde | ............ | H04L 67/306 709/202 |
| 2019/0228380 A1* | 7/2019 | Shen | ............ | G06Q 10/1091 |
| 2019/0327362 A1* | 10/2019 | Herrin | ............ | G10L 15/26 |
| 2020/0228358 A1* | 7/2020 | Rampton | ............ | G06N 3/006 |
| 2020/0258525 A1* | 8/2020 | McQuiston | ............ | G06Q 10/109 |
| 2020/0403817 A1* | 12/2020 | Daredia | ............ | G06F 16/438 |
| 2021/0021558 A1* | 1/2021 | Mahmoud | ............ | H04L 51/046 |
| 2021/0399911 A1* | 12/2021 | Jorasch | ............ | H04L 12/1822 |
| 2022/0318761 A1* | 10/2022 | Chopdekar | ............ | G06F 3/0482 |
| 2023/0046881 A1* | 2/2023 | Mishra | ............ | H04L 51/18 |
| 2023/0244857 A1* | 8/2023 | Weiss | ............ | G06Q 10/109 715/230 |
| 2023/0385778 A1* | 11/2023 | Johnson, III | ............ | G06Q 10/1095 |
| 2023/0388141 A1* | 11/2023 | Malan | ............ | H04L 51/02 |

(Continued)

FOREIGN PATENT DOCUMENTS

WO WO-2024005944 A1 * 1/2024 ............ G06F 40/40

OTHER PUBLICATIONS

"DeepMind—Working together with YouTube", retrieved at https://www.deepmind.com/blog/working-together-with-youtube, Jul. 14, 2022.

(Continued)

*Primary Examiner* — Phyllis A Book
(74) *Attorney, Agent, or Firm* — Haley Guiliano LLP

(57) ABSTRACT

System and methods of providing automatic recording of a virtual meeting based on user activity is disclosed. The method includes determining if a virtual meeting has begun and if a user is available or attentive based on one or more sensors, including a webcam, a Bluetooth controller, an infrared camera, a proximity detector, and a microphone connected to the user device. When it is determined that the user is insufficiently available or attentive, a recording of the virtual meeting is started. A user attention status may be reassessed periodically, and the recording continues as long as the user remains insufficiently available or attentive. Once the user is determined to be available, the recording is ended.

20 Claims, 13 Drawing Sheets

(56) References Cited

U.S. PATENT DOCUMENTS

2023/0403174 A1* 12/2023 Mohanty ............. H04L 12/1831
2023/0410058 A1* 12/2023 Morris .................... G06F 9/453
2023/0419270 A1* 12/2023 Li ........................ H04L 65/403
2024/0013158 A1*  1/2024 Zahavi ................. G06F 40/284
2024/0087606 A1*  3/2024 Miller ................ H04L 12/1831

OTHER PUBLICATIONS

"Microsoft—Double Key Encryption", retrieved at https://learn.microsoft.com/en-us/microsoft-365/compliance/double-key-encryption?view=o365-worldwide, Feb. 6, 2023.

Abhyankar, Parag, et al., "Finding Approximate Head orientation in non-intrusive environment with single camera", 2015 International Conference on Advances in Computer Engineering and Applications (ICACEA), 2015, 478-482.

Belmonte-Fernández, Óscar, et al., "An Indoor Positioning System Based on Wearables for Ambient-Assisted Living", Sensors, 17, 36, 2017.

\* cited by examiner

AUTOMATED MEETING RECORDINGS AND REPLAY BASED ON USER ACTIVITY AND ATTENDANCE

BACKGROUND

This disclosure is directed to systems and methods for automatically recording a portion of a meeting and providing a transcript or summary of meeting contents for the portion of the meeting. In particular, techniques are disclosed for detecting when a user is absent from or insufficiently attentive to a portion of a meeting, and recording such portions to provide to the user for review.

SUMMARY

Online meeting platforms, including video meeting software, often offer the functionality to record the contents of an entire meeting for later viewing. Certain meetings may be configured to prevent such a recording, for example for privacy concerns or when meeting contents will include sensitive information, to ensure only invited attendees are able to access the meeting. Thus, a meeting may be configured to be locked down, such that only a host may record the meeting. This prevents other attendees from initiating a recording of the meeting. Additionally, many video meeting platforms present a notification to all attendees that a meeting is being recorded.

Further, additional information may also be provided on some meeting platforms along with the video recording, such as closed captioning text from a real-time speech to text system. Available virtual meeting software, such as Microsoft Teams and Zoom, provide this functionality, where users have the option to watch a recorded video of the meeting, read a speech to text transcript, or listen to the meeting audio only.

If a user is unable to attend a portion of a locked down meeting for a variety of reasons, even if the user is an invited attendee, it can be difficult to access a summary of the contents of the missed portion. For example, a user may have a scheduling conflict, or a temporarily slow network connection, and miss a portion of the meeting without being able to access a transcript or recording if such functionality has been disabled.

In an embodiment of the present disclosure, when there is a detected scheduling conflict of a user, for example if two or more meetings overlap on a user's calendar software, a recording of the overlapping portion of the missed meeting, such as a virtual videoconference meeting, is triggered during the time in which a user is not attending the meeting. This recording can be automatically stopped when the scheduling conflict ends or when the user joins the missed meeting.

In another embodiment, if there are two consecutive meetings scheduled in a user's calendar and the first meeting extends beyond the scheduled timeframe, a recording of the first meeting can be initiated when the user leaves the first meeting to attend the second meeting. Alternatively, if the user remains in the first meeting, the portion of the second meeting missed by the user can be recorded.

In another embodiment, when it is determined that a user has a software application in focus other than the meeting application on their user device, such as a messaging app, a browser, an email application, and the like, a recording of the meeting can be initiated until the meeting application receives focus again. In an embodiment, such a recording is not initiated if the user is sharing a screen or an application window within the virtual meeting.

In another embodiment, when a user is determined to be absent or distracted from a meeting, a transcription of speech-to-text may be captured for the missing portion with an optional short delayed buffer of the meeting audio, which may or may not include a video portion. This allows a user attending the meeting to review the context of the meeting after being distracted by another activity. In a further embodiment, where audio and/or video of the meeting contents is recorded and played back to the user, the playback speed of the buffered content may be automatically increased to allow the distracted user to be re-engaged in the meeting faster than if the playback speed was the same as the original recording. This will assist the user in offering proper meeting context without requiring the user to request a meeting speaker to repeat a question or to give a summary of the previous discussion to the distracted user.

In another embodiment, a user device used to access a video conference, or virtual meeting, is configured to recognize the face of an authenticated user attending the meeting, e.g., through the use of a user device camera. If the user device detects that the user has stepped away from the device, e.g., the user is no longer in view of the user device camera, it is determined that the user has stepped away from the device and a recording will be automatically started. Such a recording trigger can be used in combination with connected wearables, such as a smartwatch or other mobile devices connected to a wireless network. The recording trigger may also be engaged when the user is using a Bluetooth enabled device, such as a headset, and the user device running the virtual meeting application detects that the headset has also been disconnected following a degradation of the Bluetooth signal quality. This may be determined as an indication that the user has moved away from the user device running the virtual meeting application and is no longer receiving the meeting audio.

In another embodiment, if the user device is forced to reboot due to a forced system upgrade, has lost battery power and has initiated a shutdown process, or is experiencing a degradation of network connectivity, a cloud recording of the meeting is triggered to be initiated. The other meeting attendees may be notified that the user is experiencing a forced reboot, a low-power forced shutdown, or network troubleshooting. After the user device has rebooted and the user logged in, or after sufficient quality of network connectivity is resumed, the user device may be automatically rejoined to the virtual meeting and the cloud recording process can automatically end.

In another embodiment, if a subset of attendees of a virtual meeting is placed in a side group conversation, the main meeting will be recorded for each side group conversation attendee, and each such attendee can be provided a speech-to-text transcript history of the main meeting for the duration of the side group conversation. The recording and speech-to-text transcript history of the main meeting will end when the attendee leaves the side group conversation and returns to the main meeting.

In another embodiment, an encryption policy for the recorded content can be set based on the meeting service provider, or can be overridden based on a company policy or by the host of the meeting. Encryption ensures that the recorded content is to be played back only on specified user devices, e.g., of an identified and authorized meeting attendee or on a local user device only, and the recorded content can be prevented from being shared and played back on any other device, including other devices owned by the authorized meeting attendee.

In another embodiment, policies can be set to control how the recorded content of the virtual meeting can be viewed. For example, a first policy can assign an expiration date to the recorded content, after which the content cannot be viewed even by the intended user. A second policy can be set for a maximum number of times the recorded content can be viewed. A third policy can determine that the recording is segmented based on a defined segment duration e.g., using adaptive bit rate (ABR) content or a group of pictures (GOP) structure level. In these cases, each segment or GOP has its own separate encryption keys. This will allow for a policy where if the content was not watched to completion in one session or the viewing is stopped, the already viewed portion of the content cannot be viewed again.

In another embodiment, using advanced encryption techniques as defined previously, a virtual meeting can be automatically recorded in its entirety based on a user's previously scheduled availability, e.g., based on a user calendar. Alternatively, the user may manually set the meeting to be recorded in the cloud.

In another embodiment, using advanced encryption techniques as defined previously, a virtual meeting may be automatically recorded due to a loss in bandwidth. Such a recording may include the entire meeting with a transcript of subtitle text, subtitle text only, audio only, audio with only captured intra pictures as image snapshots from the meeting displayed at the proper timing of the recorded audio, and the like.

In another embodiment, a recording of a virtual meeting can be archived on a local user device only, without storage in a remote or cloud-based server. The local storage may eliminate the need for additional privacy protection, as only the user of a particular user device on which the recording of the virtual meeting is saved can access the recording. In a further embodiment, multiple storage options are offered. When network bandwidth issues arise during a local recording, the local recording may be of low quality, or may have missing segments, and a remote server can be configured to automatically record corresponding segments in high quality, and subsequently replace the low quality or missing segments stored on the local device with the high quality corresponding segments when the network bandwidth to the local device permits. In either case of server-based recording or device-based recording, a segment of recording may be encrypted for playback on a target local device. In an embodiment, the remote server is not configured with the ability to decrypt the recording meeting segment, preventing any other user with access to the server from playing the recorded segment. Thus, only an identified user device is able to decrypt and play the recorded segment for a particular user. Multiple tiers of security may be implemented in an embodiment. When playback of the recording is strictly dependent on a device (e.g., based on a hardware-ID based decryption), the user may only be able play the recording on the target device. When additional flexibility is desired, the user can have a choice to authorize the server to create and store two versions of the encrypted recording. This can allow the user to play the recording on a secondary user device, e.g., a user's mobile phone, if the original device, such as a laptop, is not accessible. Note that in this embodiment, neither of the encrypted versions can be played on the server.

In one embodiment, a double-key encryption may be used to enable a user/key-based encryption. Once encrypted by the server with the first key, the server is not able to retrieve unencrypted data, which is only available by decryption with a user/second key. This is independent of a device or hardware, and relies on the user holding the second key to protect meeting data and ensure security. Therefore, this allows playing of a meeting recording on multiple devices so long as the user/second key is provided.

In an additional embodiment, meeting participants who did not attend a meeting but would like to watch a recording of the meeting might only be interested in certain portions of the meeting. For example, the meeting might have a published agenda and a user might only be interested in the topic that deals with discussing the status of a specific account. A user might also have questions about that topic that he or she would like answered during the meeting. Therefore, there is a need to allow a user not attending a meeting to participate in the meeting if desired and to quickly and efficiently navigate portions of recorded meeting content.

In one embodiment, a meeting invitee can prerecord a video and/or audio segment relating to a question or comment about a specific meeting topic, tag such prerecording as related to the topic (e.g., a topic on an agenda), and submit the prerecording to a real-time feed insertion service. Additionally or alternatively, the prerecorded segment can be automatically tagged based on a transcript of the prerecording. Users can also submit a comment or question in a text format. An example of tags includes "Q&A," "compensation," "status update on Company XYZ," and the like. Such a real-time feed insertion service is responsible for finding the appropriate time during a meeting to present the prerecorded question and accepts video/audio messages from users that were invited to the meeting. The prerecording messages can be associated with a specific meeting ID to allow the insertion service to present the correct video/audio messages in the correct meetings at the appropriate time. In an embodiment, the meeting invitee user can appear as one of the participants in the meeting. For example, a thumbnail display of the user could appear in a video gallery view among other thumbnail displays of other meeting attendees, or the user can appear in the speaker view where a large video window of the user is shown while the pre-recorded video is presented. In a further embodiment, the thumbnail display can include a visual indicator to indicate that the message is prerecorded and that the participant is not attending the meeting in real-time.

In an embodiment, only the portion of the meeting that addresses the user's question can be recorded or a link to that portion of the meeting (e.g., when a question was presented and answered) can be sent to the user. Additionally, the user might subscribe to receive a transcript (e.g., a textual representation of the answer can be sent to their phone or work e-mail) or a recording of the relevant meeting portion. Similarly, if the user submitted multiple videos or questions, then the recordings of the relevant portions can be combined before being sent to the user, even if the questions were presented and answered at different times within the meeting. Since the questions are associated with a specific user ID, the answers to the questions can be combined to present a single recording to the user. In an embodiment, such recordings can be auto chaptered to allow the user to navigate the recording in a preferred order.

In an embodiment, such features are enabled by relying on a natural language processing (NLP) module that analyzes the audio (e.g., in creating closed caption text) in real-time to generate tags and determine which topics on an existing agenda are being discussed, and then match that with the tag associated with the pre-recorded video. The NLP module can request feedback from the participants in real-time and use the feedback as confirmation. For example, a host or participant might confirm that a discussion relating to a Topic 1 has ended, or it can be indicated by a change of a slide deck in the presentation (i.e., extraction and analysis of the text from a title slide may tell the topic of next session). This can be used to generate notifications to users not attending the entire meeting. In one embodiment, the participants are queried via a voice message. For example, a voice service associated with the NLP module might ask for confirmation that Topic 2 on the agenda is not being discussed. Similarly, a prompt might be presented on the screen to collect such feedback. The queries can be based on information needed to perform a function. For example, the NLP module might be interested in whether the discussion around Topic 2 has ended if that data point is needed to perform a function (e.g., a user has subscribed to receive notification when the participants start discussing Topic 3). Therefore, the NLP module can rely on a "to-do-list" associated with any specific meeting (e.g., subscription to notifications, request to record a portion of the meeting, etc.). Similarly, the NLP module can take context into account to reduce false positives. For example, the mere mention of an account name at the beginning of the meeting when a later topic on the agenda is dedicated to discussing the status of such account, might not result in tagging that portion of the meeting to the account name. Therefore, context can include the time from when the meeting has started. Additionally, there are other ways that trigger the presentation of prerecorded questions. For example, a command from the meeting host or authorized participant to the conferencing system can result in triggering the presentation of the prerecorded comments or questions. In one embodiment, a voice profile of the participant is used to verify whether the participant is authorized to trigger the presentation of the prerecorded content. Additionally, the source of the audio command (e.g., the user device that the command was received through) may be used in verifying whether the participant is authorized to trigger the presentation. The order of presentation can be based on the time the service received the questions, or based on the order of the various topics on the agenda and the association of these questions to the topics, and the like.

In one embodiment, any prerecorded segments of the meeting are available and presented to the host of the meeting to allow the host to accept or reject one or more of the pre-recorded videos. Similarly, the real-time feed insertion or video insertion service can request approval before presenting a pre-recorded video (e.g., a prompt can be displayed on the host's computer or any designated delegate) to approve the insertion of the prerecorded message. This can ensure that the approved prerecorded videos are presented at a correct time. The real-time feed insertion can also determine duplicate (e.g., similar) questions or comments from different participants and merge them as appropriate. Combining or merging pre-recorded content can also be reviewed/approved by a host or a user approved to perform such task.

In an embodiment, any of the features discussed herein are optional to apply to a meeting or video conference, and the host can select which features to make available to the participants before a meeting invite is generated and sent to potential meeting attendees. This limits participants to only subscribe to features approved and offered by the meeting host.

In one embodiment, a user that is not planning on attending the entire meeting can subscribe to notifications related to events within the meeting. An event can be the start of a discussion of a specific topic on the agenda or a time when a specific person joins the meeting (e.g., user A might be interested in joining the meeting only when user B joins if they are both giving a joint presentation during the meeting). Every topic that was designated by the host as eligible for notifications can be subscribed to by one or more participants in the meeting (e.g., a host can designate whether any participant can subscribe, or whether only select participants can subscribe). Subscriptions can occur via 'Subscribe' icons within the meeting invite. For example, mangers may wish to attend portions of a meeting run by subordinates, and only comment or be involved in discussing a specific topic. Additionally, an option could be presented to the participants in the meeting that suggests notifying an interested party (e.g., a manager), which could trigger the generation of the notification or invite. This can also be used as a verification that the topic of interest is about to be discussed. A participant monitoring service can determine whether a user that subscribed to a topic joined the meeting or not, and may record that portion of the meeting, e.g., if it is determined that the user did not join, and make it accessible to the user that subscribed to it.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

Figure 1:
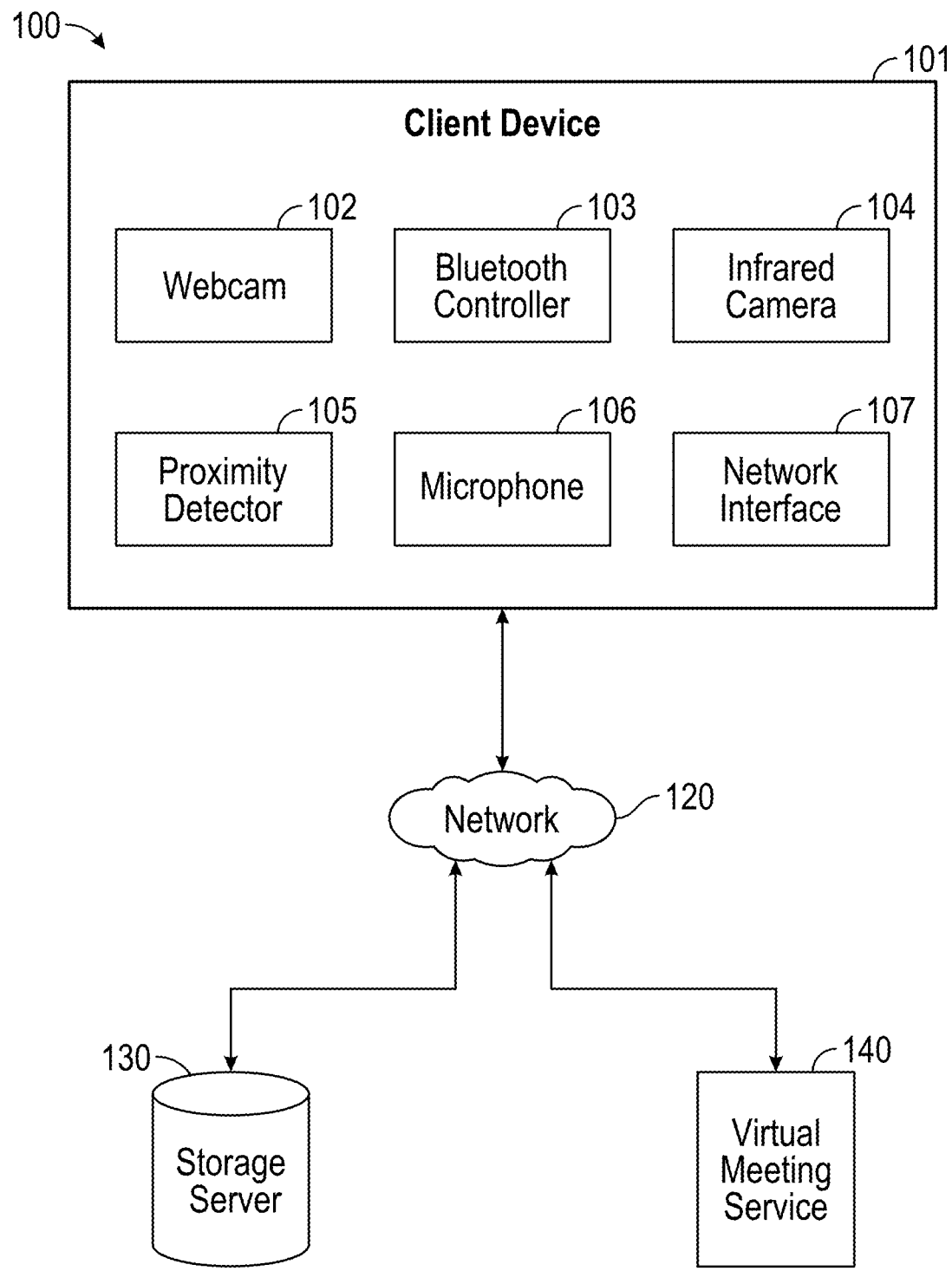
FIG. 1 is a block diagram of a system for providing automated virtual meeting recordings, in accordance with some embodiments of this disclosure.

FIG. 1 is a block diagram of a system 100 for providing automated virtual meeting recordings, in accordance with some embodiments of this disclosure. According to some embodiments, a virtual meeting, also referred to as a virtual conference, can be an audio only conference meeting, a video only conference meeting, or a conference meeting with both audio and video. In an embodiment, the system 100 comprises a client device 101, a network 120, a storage server 130, and a virtual meeting service 140. In the example shown, client device 101 comprises a plurality of sensors, including a webcam 102, a Bluetooth controller 103, an infrared camera 104, a proximity detector 105, and a microphone 106. Client device 101 also includes a network interface 107, configured to connect to a network, such as network 120. Client device 101 may also include additional components, as discussed further below in FIG. 4.

The disclosed methods and systems may be implemented on one or more client devices 101. As referred to herein, client device 101 can be any device comprising a processor and memory, for example a handheld computer, a stationary telephone, a personal digital assistant (PDA), a mobile telephone, a smartphone, a smartwatch, a smart speaker, an augmented reality device, a mixed reality device, a virtual reality device, a gaming console, a television, a smart television, a set-top box, an integrated receiver decoder (IRD) for handling satellite television, a digital storage device, a digital media receiver (DMR), a digital media adapter (DMA), a streaming media device, a personal computer (PC), a laptop computer, a tablet computer, a WebTV box, a personal computer television (PC/TV), a PC media server, a PC media center, or any other television equipment, computing equipment, or wireless device, and/or combination of the same.

Client device 101 may operate in a cloud computing environment to access cloud services. In a cloud computing environment, various types of computing services for content sharing, storage, or distribution (e.g., video sharing sites or social networking sites) are provided by a collection of network-accessible computing and storage resources, referred to as "the cloud." For example, the cloud can include a collection of server computing devices (such as, e.g., storage server 130), which may be located centrally or at distributed locations, that provide cloud-based services to various types of users and devices connected via a network such as the Internet via network 120. In such embodiments, a plurality of client devices 101 may operate in a peer-to-peer manner without communicating with a central server.

Network 120 may be one or more networks including the Internet, a mobile phone network, mobile voice or data network (e.g., an LTE, 4G, or 5G network), cable network, public switched telephone network, or other types of communications network or combinations of communications networks. Paths (e.g., depicted as arrows connecting the respective components to network 120) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

In an embodiment, client device 101 is associated with a user who is participating in a virtual conference meeting (e.g., a main audio and/or video conference comprising a plurality of participants) by way of a conferencing application supported on client device 101. In another embodiment, the conferencing application may be implemented by a virtual meeting service 140 running independently or on storage server 130, such as a proprietary server associated with virtual meeting service 140. A user can participate in the virtual meeting, such as by speaking and sharing audio and video, receiving audio and video from other participants in the conference, and the like. The user can also join multiple groups, for example, by simultaneously attending the main conference while starting and/or participating in a side group conversation comprising a subgroup of the plurality of participants. Conversations in the side group conversation are isolated from other groups. When the user participates in the side group conversation, only other users in the side group can access the user's side group audio and video.

In an embodiment, outgoing audio and video streams from the user may be transmitted from client device 101 to virtual meeting service 140 via network 120 through the network interface 107. Microphone 106 and webcam 102 capture the user's audio and video input, respectively.

In an embodiment, client device 101 is configured to run software that detects availability and/or attentive status of the user based on the plurality of sensors, including the webcam 102, Bluetooth controller 103, infrared camera 104, proximity detector 105, and microphone 106.

Figure 2:
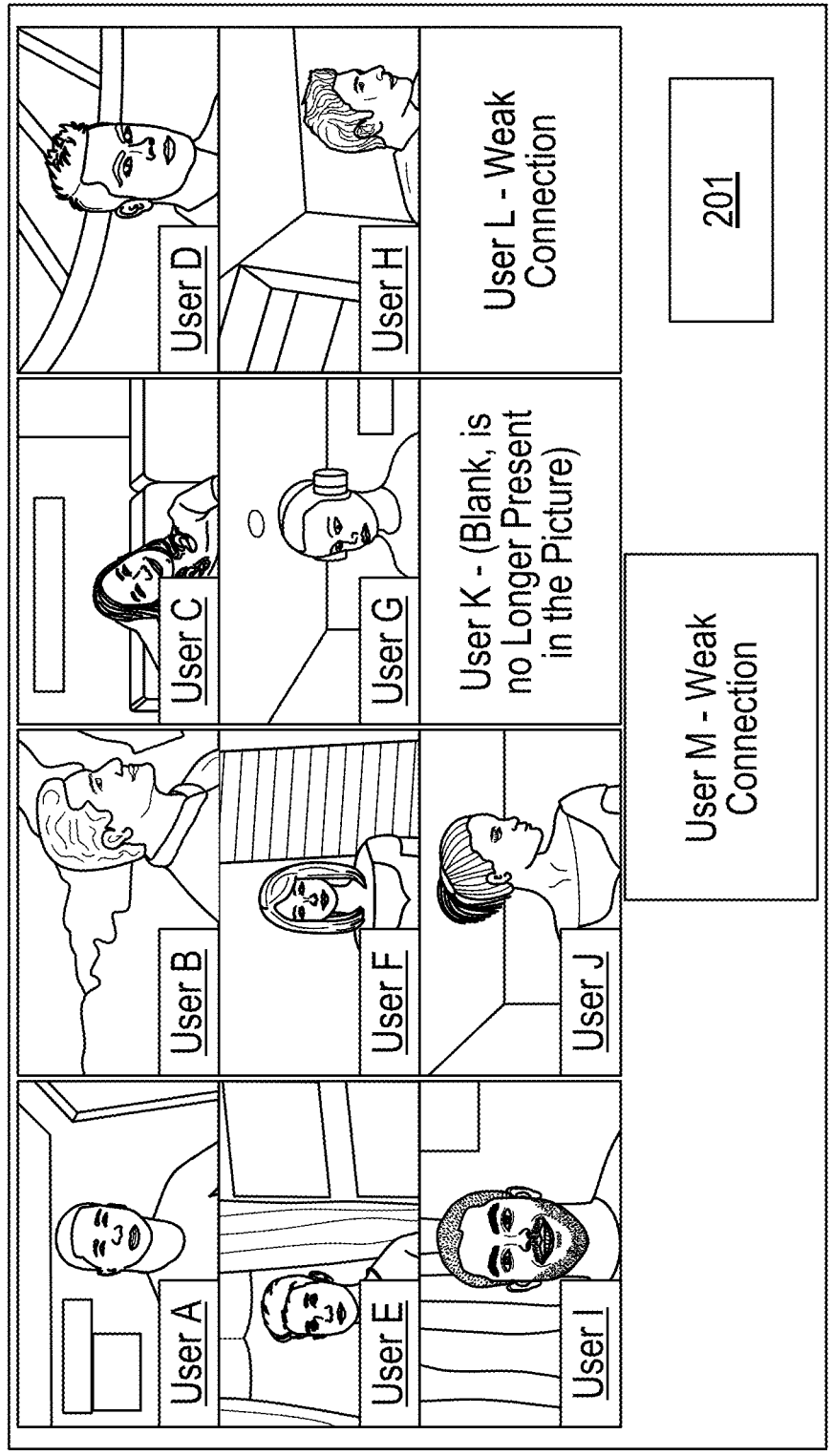
FIG. 2 shows an illustrative display of a virtual meeting, in accordance with some embodiments of this disclosure.

FIG. 2 shows an illustrative display of a virtual meeting, in accordance with some embodiments of this disclosure. For example, a window 201 of the virtual meeting software displays a gallery of users A through M. In an embodiment, each cell within the gallery displays a single user, which may include a video stream transmitted from a camera, or webcam, of a device associated with that user. Users' expressions and body posture will be shown, including whether the user is facing their associated webcam, looking to side, or not present.

In an embodiment, software running on a user device analyzes the user to detect a user attention status using a user availability indicator to determine if a user among the virtual meeting participants is currently present or attentive in the virtual meeting. For example, if the image of a user captured from a webcam shows that a user is facing away from the webcam for a predetermined period of time and/or the user device has a non-related application window in focus, and/or an unmuted microphone indicates no meeting-relevant sounds, such as a user voice, are being detected for a predetermined period of time, it may be determined that the user is not attentive to the meeting. As further discussed below, such a determination may trigger a recording for a segment of the virtual meeting that the user remains insufficiently attentive.

In some embodiments, for users having their device's camera off or disabled and/or having their device's microphone off or muted (e.g., completely turned off with respect to the central server), the software may be configured to monitor a user locally (e.g., by a camera and/or microphone of the user's device and/or an external device in a vicinity of the user's device) during the virtual meeting. For example, one user (e.g., a professor or teacher) may ask other users to disable their video and/or audio to conserve bandwidth during the virtual meeting, or users may decide for privacy reasons to disable their video and/or audio during the virtual meeting. Even though video, audio, and/or text of users in these circumstances may not be provided to the virtual meeting service, the users reactions may be locally analyzed, and an indication of such an analysis may be transmitted to the central server. On the other hand, for other users in the virtual meeting, a central server may monitor reactions of users whose computing device's camera and/or microphone is not turned off. This may alleviate a remote server's burden of determining the attentiveness of all meeting participants (e.g., having to analyze the raw audio or image data or other sensor data corresponding to the reactions) for a potentially large number of computing devices participating in the virtual meeting.

Figure 3:
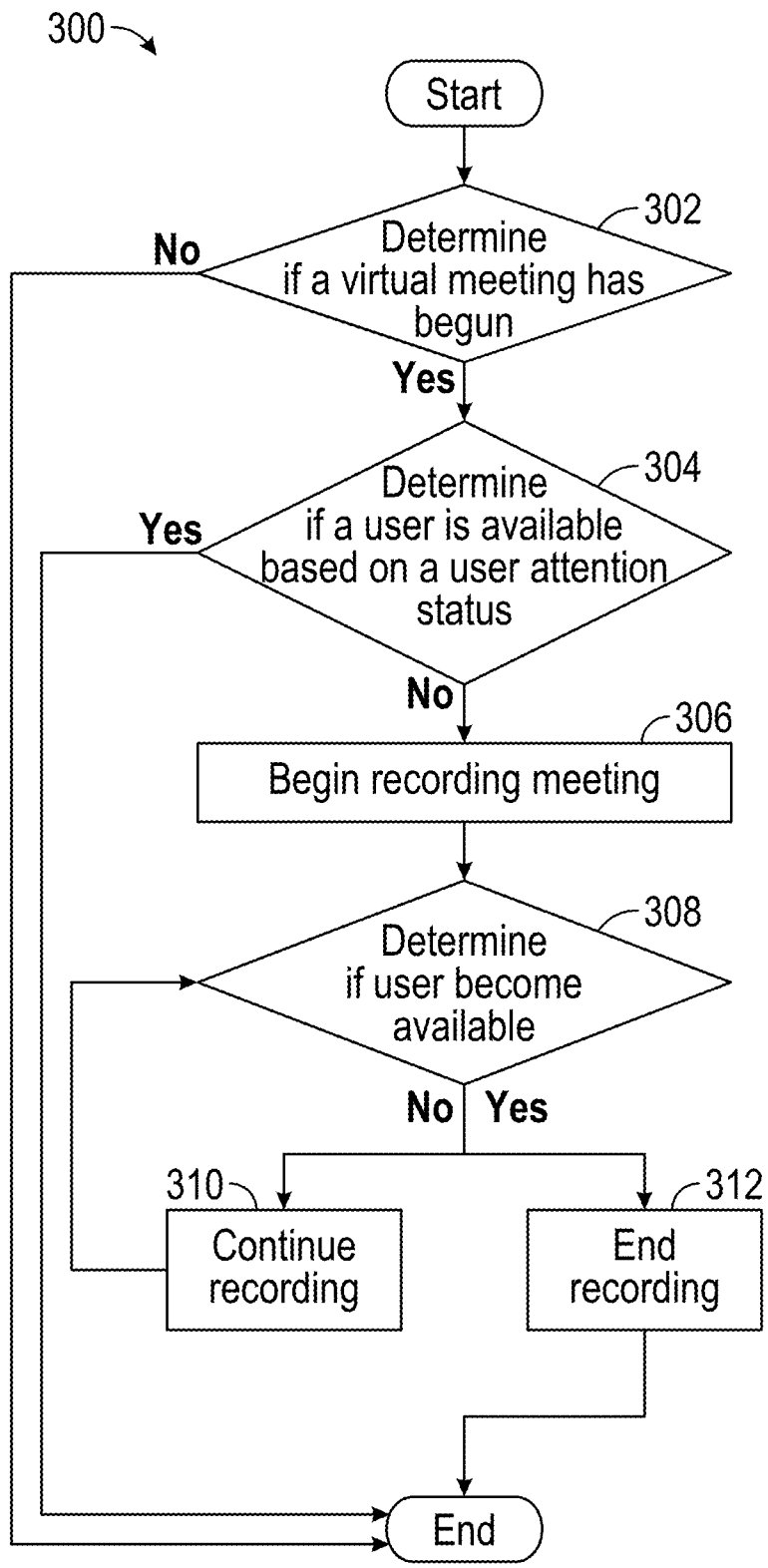
FIG. 3 is a flowchart for providing automatic recordings of a virtual meeting based on user activity, in accordance with some embodiments of this disclosure.

FIG. 3 is a flowchart for a method 300 of providing automatic recordings of a virtual meeting based on user activity, in accordance with some embodiments of this disclosure. The method 300 begins at step 302 with determining if a virtual meeting has begun. In an embodiment, determining if a virtual meeting has begun is performed by software installed on a user device, where the user device is also configured to run virtual meeting software. In a further embodiment, the virtual meeting software is configured to perform the determination without reliance on a separate program. If it is determined that a virtual meeting has not begun, the method ends. If it is determined that a virtual meeting has begun, the method continues at step 304.

At step 304, it is determined if a user is available or attentive based on a user availability status. In an embodiment, the user attention status is determined based on a user availability indicator. The user availability indicator is an indicator signaling whether or not a user is sufficiently attentive or present within the virtual meeting (e.g., whether the user has joined the meeting). The user availability indicator may be determined based on one or more sensors of a user device, including a webcam, a Bluetooth controller, an infrared camera, a proximity detector, and a microphone connected to the user device as further discussed herein. Additional connected user devices, such as a user's mobile phone, tablet, personal computer, or wearable devices such as a smartwatch, and the like, may also be used in determining a user availability status. Determination of whether a user has moved away from the user device using the proximity of an audio headset or a smartwatch connected to the user device via Bluetooth, or the distance of a wearable device from the user device via Wi-Fi positioning may be implemented in determining the user attention status. Further, the user attention status may be determined based on whether the user is involved in a phone call or text messaging during a virtual meeting. User devices, including desktop and laptop computers, may be equipped with Bluetooth and Wi-Fi connectivity, which can be paired with wearable or personal devices and used to determine a user's mobile phone activity. Thus, a recording may be initiated if it is determined that a user places or receives a phone call or sends SMS text messages during a virtual meeting. Further, the user availability indicator may be determined based on if the user has joined the virtual meeting, or if the user has left the meeting, even temporarily, at any point during the virtual meeting. If the user is determined to be sufficiently available or attentive, the method ends; otherwise, the method continues at step 306.

At step 306, when it has been determined that the user is insufficiently available or attentive, a recording of the virtual meeting is started. The recording may be a recording of audio only, video only, or combination of audio and video. In an embodiment, only the audio and/or video of an active speaker of the meeting is recorded. In a further embodiment, audio and/or video of all of the virtual meeting participants, e.g., a video of a gallery showing video feeds of the virtual meeting participants, is recorded.

At step 308, it is determined if the user has become available or has become sufficiently attentive. This determination may be performed at regular intervals once a recording of the virtual meeting has begun. For example, the user attention status may be reassessed based on requesting updates from the user availability indicators every 30 seconds. If it is determined that the user remains insufficiently available or attentive, the recording continues at step 310 and returns to step 308 where the user attention status continues to be monitored. If it is determined that the user is now available or sufficiently attentive, the method continues at step 312 where the recording of the virtual meeting ends.

Figure 4:
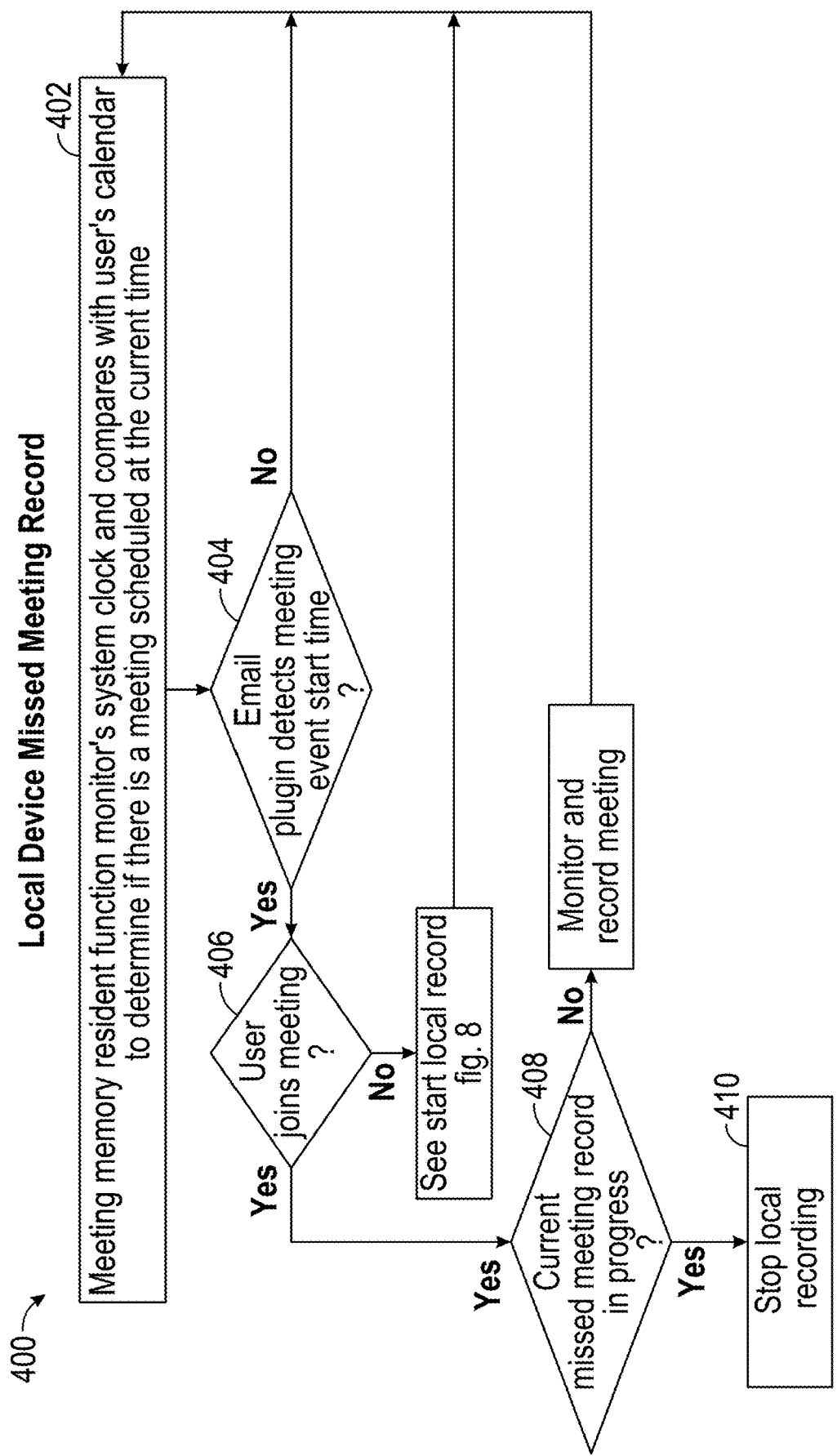
FIG. 4 is a flowchart for automatically recording a virtual meeting based on user attendance, in accordance with some embodiments of the present disclosure.

FIG. 4 is a flowchart of a method 400 for automatically recording a virtual meeting based on user attendance, in accordance with some embodiments of the present disclosure. At step 402, a user calendar is accessed, e.g., on an associated user device, and it is determined if there is a virtual meeting scheduled in the user's calendar at the current time. If not, step 402 is repeated and the user calendar is monitored, e.g., at predetermined intervals. If a meeting is determined to be currently scheduled, the method continues at step 404, where it is determined, e.g., via an email or calendar program plug-in application, if the scheduled meeting has begun.

At step 406, it is determined if the user has joined the virtual meetings. If not, a meeting recording is commenced, as further discussed below with regards to FIG. 6. If it is determined that the user has joined the virtual meeting, the method continues at step 408. At step 408, it is determined if a previously triggered recording, e.g., a local recording of the virtual meeting, has begun, and if so, the recording is ended at step 410. If no previous recording has begun, the method continues with monitoring and recording a segment of the virtual meeting as further discussed in FIG. 5 below.

Figure 5A:
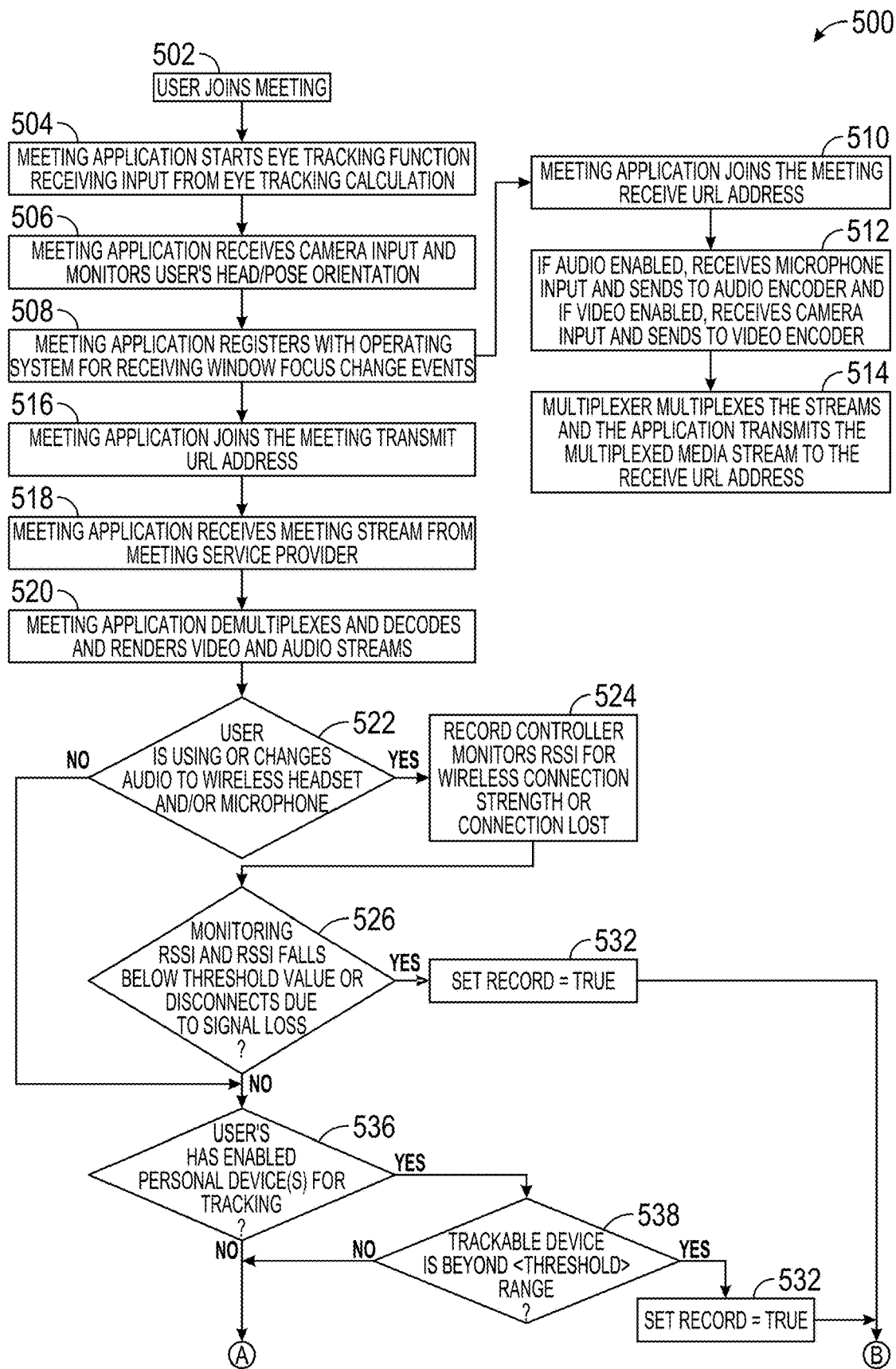
FIGS. 5A-5B are flowcharts of a detailed illustrative process for automatically recording a virtual meeting based on user activity, in accordance with some embodiments of this disclosure.
Figure 5B:
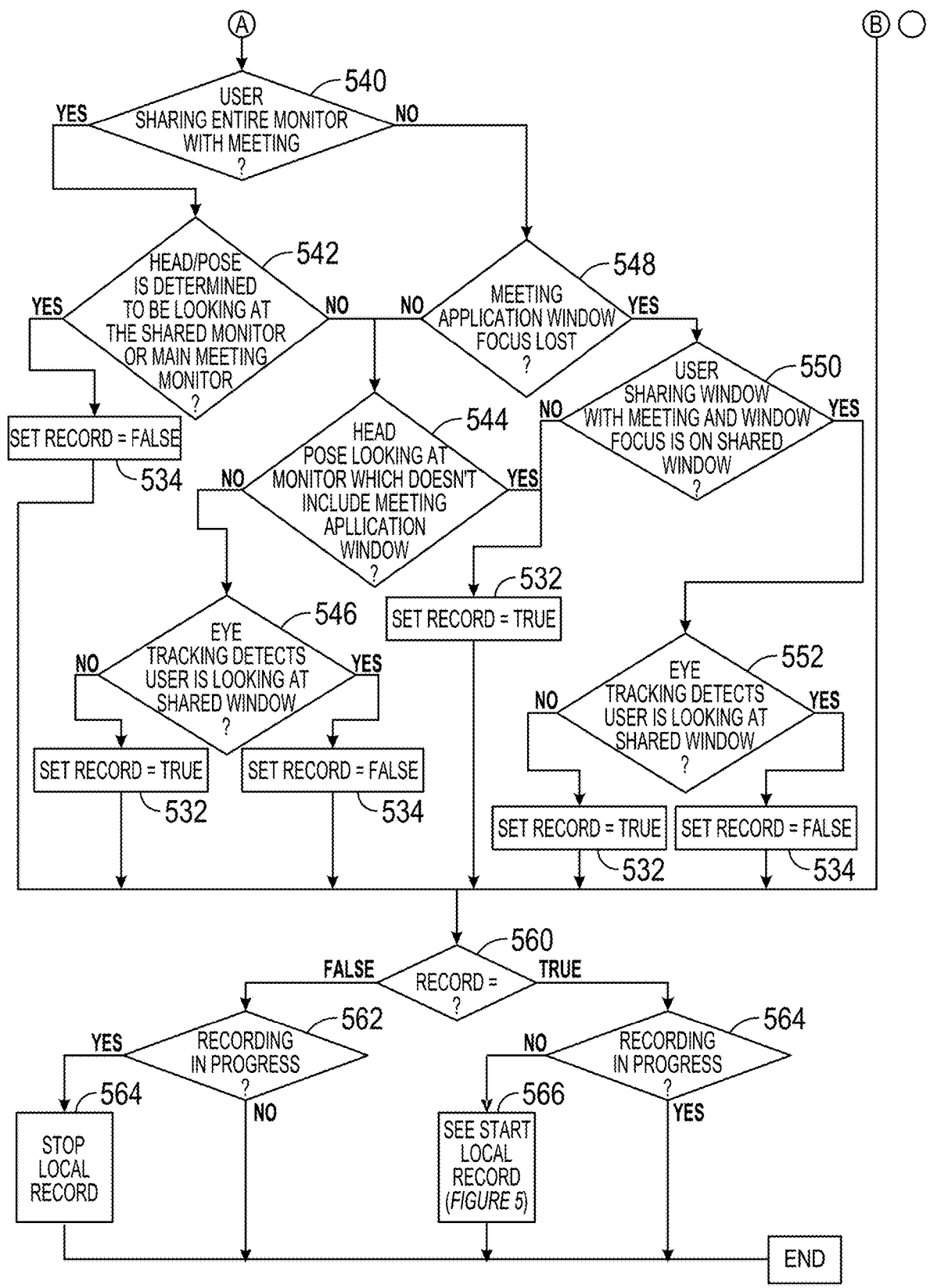

FIGS. 5A-5B are flowcharts of a detailed illustrative process 500 for automatically recording a virtual meeting based on user activity, in accordance with some embodiments of this disclosure. In an embodiment, the process is performed by a meeting monitoring application that can be installed locally on a user device or deployed on a remote server.

At step 502, a user joins a virtual meeting, e.g., from a user device connected to a virtual meeting service via a network. The method continues with determining if a user is or becomes insufficiently attentive or absent from the virtual meeting. At step 504, an eye tracking function is performed, e.g., via a webcam which may include an eye tracking sensor connected to the user device, to determine if the user is displaying sufficient eye contact with or near the webcam. At step 506, webcam input is analyzed to determine if the user is facing away from the camera, e.g., for a predetermined period of time, during the virtual meeting. This can be determined based on a user's head orientation or pose. Additionally, at step 508, it is determined if the user has activated a different application from the virtual meeting software, e.g., when the user is not currently sharing a screen or window with the virtual meeting. For example, if a user is determined to be using an email client software or a web browser software while the virtual meeting is in progress, e.g., for a predetermined period of time, it may be determined that the user is insufficiently attentive to the virtual meeting, and the process continues at step 510, where a stream of the virtual meeting is accessed, e.g., from a virtual meeting server via a meeting receive URL address. At step 512, input from audio and video of the virtual meeting is received and sent to local audio and video encoders, respectively. In an embodiment, at step 514 a multiplexer multiplexes various streams received from the virtual meeting service and transmits the multiplexed streams to the virtual meeting server, e.g., to be transmitted to other meeting attendees. In a further embodiment, audio and/or video of a virtual meeting is received and transmitted over a single stream.

If the user has been determined to be sufficiently attentive or present at the virtual meeting, the process continues at step 516, where a meeting transmit URL address is connected to, e.g., via the meeting monitoring application. At step 518, the meeting monitoring application receives a video and/or audio stream of virtual meeting from the meeting service provider. In some embodiments, at step 520, video and audio streams are demultiplexed, and if required, decoded, e.g., via the meeting monitoring application. In a further embodiment, the virtual meeting is received in a single stream and no demultiplexing is required.

At step 522, the input audio of the user is analyzed to determine if the user is currently using or begins to use a wireless audio connection, e.g., using a wireless headset and/or microphone. If not, the process continues at step 536. If so, at step 524 the wireless connection strength is monitored to determine if the connection is weak or no longer active, and at step 526, it is determined if the wireless signal falls below a predetermined threshold or disconnects. If so, at step 532 a "Set Record" variable, indicating that a recording of the virtual meeting should commence, is set to true and the process continues at step 560. Otherwise, the process continues with step 536.

At step 536, it is determined if the user has enabled tracking on personal devices, e.g., devices that are separate from the user device on which the virtual meeting is accessed. Such personal devices may include a mobile phone, a smartwatch, and a tracking tag, and the like. If tracking has been enabled, the process continues at step 538 where it is determined if the personal devices are beyond a predetermined threshold connection range. If so, the process continues at step 532, where the "Set Record" variable is set to true and the process continues at step 560. Otherwise, the process continues with step 540.

At step 540, it is determined if the user is screen sharing their entire display within the virtual meeting. If so, at step 542 it is determined, e.g., via a user device webcam, if the user is looking at a meeting display, such as the shared display or a main virtual meeting display. If the user is determined to be looking at a meeting display, the "Set Record" variable is set to false, and the process continues at step 560. If not, the process continues at 544. At step 544, it is determined if the user is facing or focusing on a monitor or display that does not include a meeting application window. If so, the "Set Record" variable is set to true 532 and the process continues at step 560. If not, the process continues at step 546 where an eye tracking function is enabled to detect, based on the user's eye movements and positioning, if a user is looking at the virtual meeting display. If not, the "Set Record" variable is set to true 532 and the process continues at step 560. If so, the "Set Record" variable is set to false 534 and the process continues at step 560.

Returning to step 540, if it is determined that the user is not screen sharing their entire display within the virtual meeting, the process continues at step 548 where it is determined if the meeting application window is currently in focus by the user or has lost focus on the user device. If the meeting application window has not lost the user's focus, the process continues at step 544 discussed above. If the meeting application window has lost focus, the process continues at step 550 where it is determined if the user is sharing a window within the virtual meeting and if that window is in focus. If not the "Set Record" variable is set to true 532 and the process continues at step 560. If so, the process continues at step 552 where an eye tracking function is enabled to detect, based on the user's eye movements and positioning, if a user is looking at the virtual meeting display. If not, the "Set Record" variable is set to true 532 and the process continues at step 560. If so, the "Set Record" variable is set to false 534 and the process continues at step 560.

The process continues at step 560, where it is determined if the "Set Record" variable is set to false or true. If set to false, it is determined if a recording of the virtual meeting is currently in progress at step 562. If so, the recording is stopped at step 564. If not, the process ends. If the "Set Record" variable is set to true, at it is determined if a recording of the virtual meeting is currently in progress at step 564. If not, a recording is starting at step 566. If not, the process ends.

Figure 6:
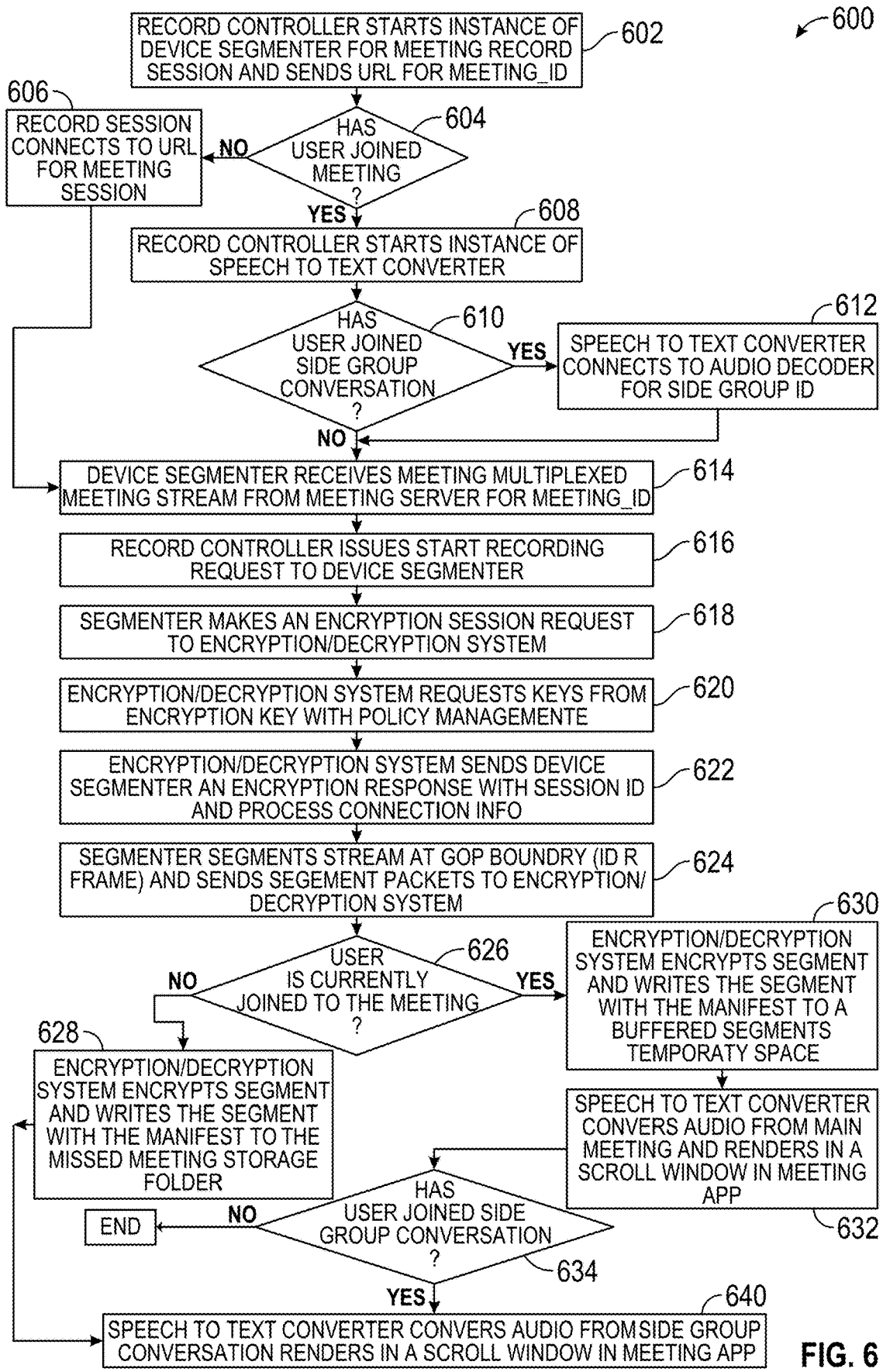
FIG. 6 is a flowchart for recording, transcribing, and encrypting a virtual meeting, in accordance with some embodiments of this disclosure.

FIG. 6 is a flowchart of a process 600 for recording, transcribing, and encrypting a virtual meeting, in accordance with some embodiments of this disclosure. At step 602, a record controller, e.g., run locally on a user device or remotely on a virtual meeting service, starts an instance of a device segmenter for a meeting record session and requests a link, such as a URL link, for a virtual meeting. At step 604, it is determined if a particular user has joined the virtual meeting. If not, the record session connects to the URL for the meeting session at step 606, and continues at step 614. If the user has joined the meeting, the process continues at step 608 where the record controller starts an instance of a speech to text converter.

At step 610, it is determined if the user has joined a side group session that is separate from a main portion of the virtual meeting. If not, the process continues at step 614. If so, at step 612 the speech to text converter connects to an audio decoder for the side group session and the process continues at step 614.

At step 614, the device segmenter receives a multiplex stream from the virtual meeting service, e.g., from a meeting server and at step 616 the record controller issues a start recording request to the device segmenter and the process continues at step 618. In an embodiment, audio and/or video of a virtual meeting is received and transmitted over a single stream.

At step 618, the device segmenter transmits an encryption request to an encryption/decryption system and the process continues at step 620. In one embodiment, the encryption/decryption system runs locally on the user device, and in a further embodiment the encryption/decryption system runs remotely, e.g., from a remote server connected via the Internet.

At step 620, the encryption/decryption system requests an encryption key in accordance with a policy management system associated with the virtual meeting service. At step 622, the encryption/decryption system sends an encryption response, e.g., with a session ID and process connection information, to the device segmenter. At step 624, the device segmenter segments a stream of the virtual meeting. In an embodiment, the segmentation relies on a group of pictures (GOP) structure in determining how to segment the stream.

At step 626, it is determined if the user has currently joined the virtual meeting. If not, the encryption/decryption system encrypts a segment of the stream and records the segment with a manifest file to a missed meeting storage location and the process continues with step 640. If the user has joined the meeting, the process continues at step 630, where the encryption/decryption system encrypts a segment of the stream and records the segment with a manifest file to a buffered segments temporary space to store the recording, and continues with step 632 where the speech to text converter converts audio from the main meeting to text. In an embodiment, the transcribed meeting text is displayed to the user, e.g., in a side transcription window. At step 634, it is determined if a user has joined the side group session. If not the process ends. If so, at step 640 the converted transcribed text from the side group session is displayed to the user, e.g., in a side transcription window.

Figure 7:
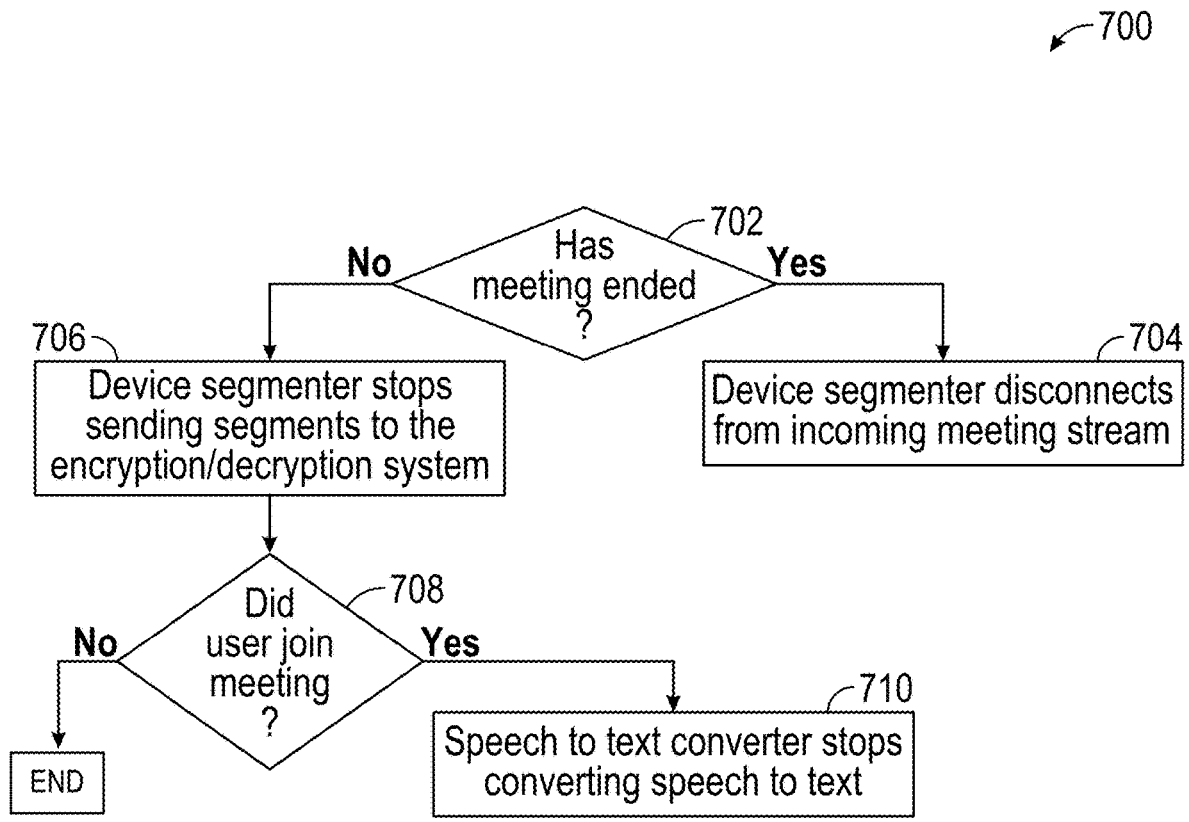
FIG. 7 is a flowchart of a method for determining if a virtual meeting has ended, in accordance with some embodiments of the present disclosure.

FIG. 7 is a flowchart of a method 700 for determining if a virtual meeting has ended, in accordance with some embodiments of the present disclosure. At step 702, it is determined is the virtual meeting has concluded. If so, the process continues at step 704, where the device segmenter disconnects from the virtual meeting service and stops receiving the meeting stream. If the meeting had not ended, the process continues at step 706, where the device segmenter stops sending segments to the encryption/decryption system and continues at step 708 where it is determined if the user has joined the meeting. If so, a speech to text converter, e.g., such as the speech to text converter used in step 808 of FIG. 8, stops transcribing text. If not, the process ends.

Figure 8:
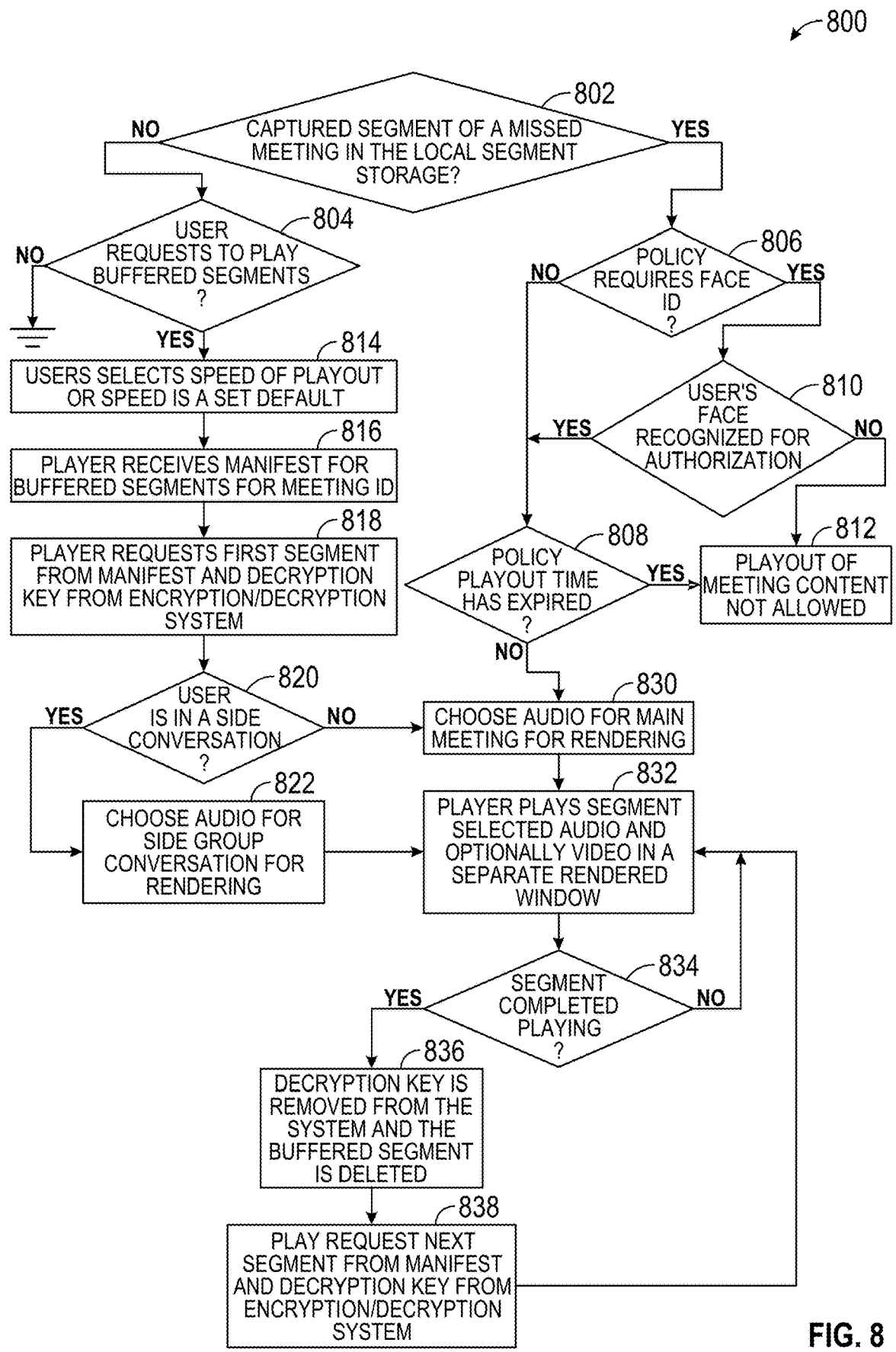
FIG. 8 is a flowchart of a method for playing a recorded segment of a virtual meeting, in accordance with some embodiments of the present disclosure.

FIG. 8 is a flowchart of a method 800 for playing a recorded segment of a virtual meeting, in accordance with some embodiments of the present disclosure. At step 802, it is determined if a segment of a virtual meeting has been recorded. For example, a partial or complete recording of a virtual meeting may have been recorded, e.g., in a local storage, based on a determination that a user was not present or insufficiently attentive to part of all of a virtual meeting based on various user devices sensors, as discuss above with regards to FIGS. 1 and 3. If no segment of the virtual meeting was recorded, the process continues at step 804, otherwise the process continues at step 806.

At step 804, it is determined if there is a request, e.g., from a user device, to play buffered segments of the virtual meeting. If not, the process ends. Otherwise, the process continues at step 814, where a user selects a particular playback speed of a recording of the virtual meeting. At step 816, a manifest file for buffered segments of the virtual meeting is received, and at step 818 a first segment is requests from manifest file and a decryption key is requested from an encryption/decryption system in order to decrypt a recording that has been encrypted. At step 820, it is determined if a user is present in a side meeting group separate from the main group of the virtual meeting, and if so, at step 822 audio from the side meeting group is selected for streaming. The process then continues at step 832. If it is determined that a user is not present in a side meeting group, the process continues at step 830.

Returning to step 806, it is determined if the virtual meeting is configured to require identification of the user, e.g., based on an image of the user's face. If not, the process continues at step 808. If identification of the user is required, the process continues at step 810 where it is determined if the user's face is recognized for access authorization. If the user's face is not recognized, the virtual meeting stream is not played and the process ends at step 812. If the user's face is recognized, the process continues with step 808 where it is determined if a policy playout time has expired. If so, the virtual meeting stream is not allowed to be played and the process ends at step 812. Otherwise, the process continues at step 830.

At step 830, audio from the main meeting group is selected for rendering. At step 832, the selected audio is played in a separately rendered window that plays independently of a live stream of the virtual meeting. At step 834, it is determined if the recorded segment has completed playback. If not, the playback continues, and if the playback has been completed, the process continues with step 836, where a decryption key is removed from a user device and the recorded buffered segment is deleted. At step 838, the next segment of the virtual meeting is played according to the manifest file using the encryption/decryption system. If no more recorded segments remain, the process ends.

Figure 9:
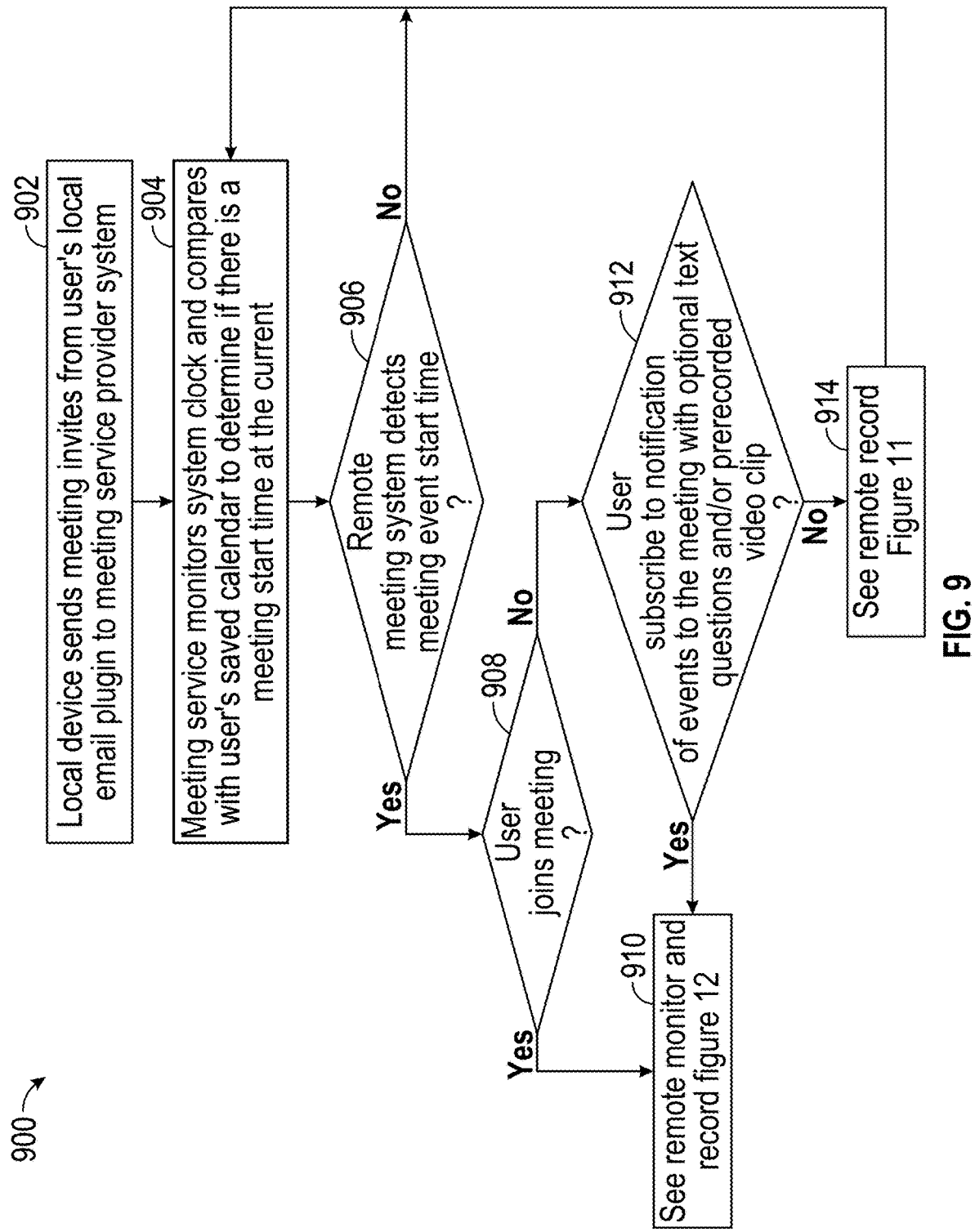
FIG. 9 is a flowchart of a method for triggering a remote recording of a virtual meeting, in accordance with some embodiments of the present disclosure.

FIG. 9 is a flowchart of a method 900 for triggering a remote recording of a virtual meeting, in accordance with some embodiments of the present disclosure. At step 902, a local device, e.g., a user device, transmits a meeting invitation from a local calendar or email program to a virtual meeting service system. At step 904, the virtual meeting service system compares the meeting invite to a scheduled virtual meeting and determines the current time to determine if a meeting is currently scheduled. At step 906 a remote virtual meeting system determines if a virtual meeting event start time has passed. If not, the process continues monitoring the user and virtual meeting system at step 904. If a meeting start time is determined to have passed, the process continues at step 908 where it is determined if a user has joined the virtual meeting. If so, a remote monitoring and recording process begins as discussed below regarding FIG. 10. If not, it is determined if a user is subscribed to notifications of events related to the virtual meeting. If so, the remote monitoring and recording process begins as discussed below regarding FIG. 10. If not, the process continues with a remote recording as discussed below regarding FIG. 11.

Figure 10A:
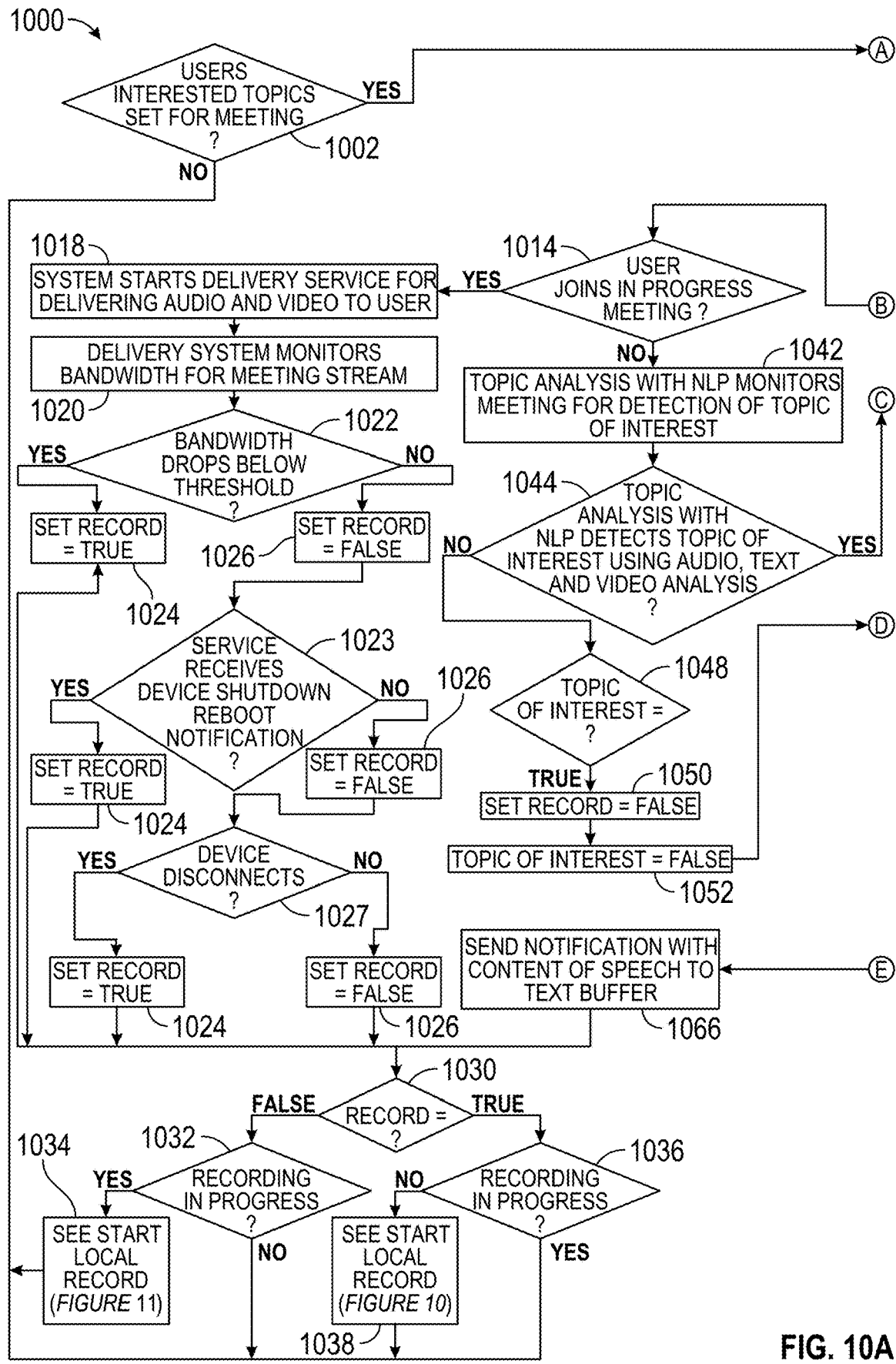
FIGS. 10A-10B are flowcharts of a method for remotely monitoring and recording a virtual meeting, in accordance with some embodiments of the present disclosure.
Figure 10B:
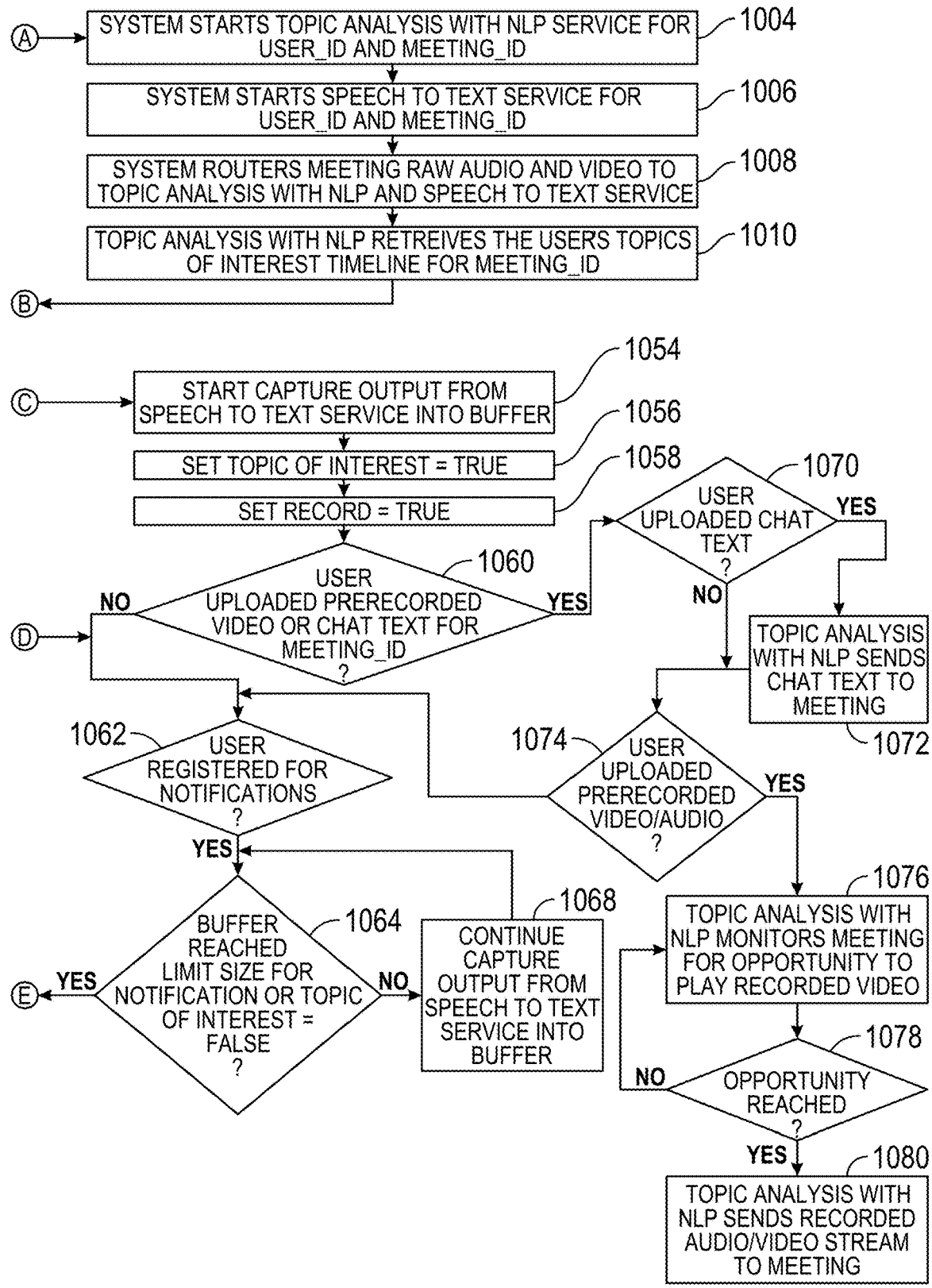

FIG. 10 is a flowchart of a method 1000 for remotely monitoring and recording a virtual meeting, in accordance with some embodiments of the present disclosure. At step 1002, it is determined if a meeting is associated with one or more meeting topics. Meeting topics may include topics presented in a meeting agenda or preset at chapters within a scheduled virtual meeting, and are representative of topics to be covered or discussed during the virtual meeting. If no meeting topics are associated with the meeting, the process continues with recording the virtual meeting as described above in FIGS. 3, 7, and 8. If meeting topics are determined to be associated with a meeting, the process continues with step 1004.

At step 1004, a system starts a topic analysis with a natural language processing (NLP) process for a particular user and a particular virtual meeting. At step 1006, a speech to text transcribing service for the user and virtual meeting is started. At step 1008, audio and/or video streams are received and analyzed by the NLP process and speech to text transcribing service to perform a topic analysis to determine topics of a virtual meeting. At step 1010, previously saved user topics of interest are retrieved, and at step 1014, it is determined if a user has joined a virtual meeting.

If it is determined that a user has joined a virtual meeting, the process continues with step 1018, otherwise the process continues at step 1040. At step 1018, audio and/or video of a virtual meeting is received. At step 1022, it is determined if bandwidth of the audio/video stream has fallen below a predetermined threshold. If so, the "Set Record" variable is set to true at step 1024, and the process continues at step 1030. Otherwise, the "Set Record" variable is set to false at step 1026, and the process continues at step 1023. At step 1023, it is determined if a user device shutdown or restart notification has been received from the user device. If so, the "Set Record" variable is set to true at step 1024, and the process continues at step 1030. Otherwise, the "Set Record" variable is set to false at step 1026, and the process continues at step 1027. At step 1027, it is determined if the user devices have disconnected from a virtual meeting service. If so, the "Set Record" variable is set to true at step 1024, and the process continues at step 1030. Otherwise, the "Set Record" variable is set to false at step 1026, and the process continues at step 1030.

Referring back to step 1014, if it is determined that a user has not joined the virtual meeting, the process continues at step 1042 where the NLP process is configured to monitor if a topic of interest of the user is present within the virtual meeting. At 1044, a topic analysis of the virtual meeting is performed based on NLP processing of audio, text, and video of the virtual meeting to determine if a user topic of interest is present. If no topic of interest is present, the "Set Record" and "Topic of Interest" variables are set to false at steps 1050 and 1052, respectively, and the process continues at step 1062. If it is determined that a topic of interest is present, the process continues with step 1054, where output from a speech to text service from the virtual meeting is captured and the "Set Record" and "Topic of Interest" variables are set to true, at steps 1056 and 1058, respectively, and the process continues at step 1060, where it is determined if a user has uploaded a prerecorded video or text related to topics of interest. If not, the process continues at step 1062, otherwise the process continues at step 1070. If it is determined that a user has uploaded text related to a topic of interest, e.g., to the virtual meeting service at step 1070, the uploaded text is displayed at the virtual meeting at a relevant segment that matches the topic of interest. At step 1074, it is determined if a prerecorded video related to the topic of interest has been uploaded e.g., to the virtual meeting service. If so, virtual meeting is monitored at step 1078 to determine the matching topic of interest is currently being addressed in the virtual meeting, and if so, the prerecorded video is displayed at the virtual meeting at a relevant segment that matches the topic of interest at step 1080.

Returning to step 1062, it is determined if the user has registered for meeting notifications. If not, the speech to text output is captured and stored in a buffer storage. If a user has registered for meeting notifications, it is determined if the topic of interest is presently being addressed at the virtual meeting, and if so, a notification is sent to a user at step 1066 and the process continues at step 1030, otherwise the process continues at step 1030.

At step 1030, it is determined if the "Set Record" variable is set to true. If so, the process continues with step 1036 where it is determined if a recording is currently in progress. If so, the process ends. If not, a recording is commenced. If the "Set Record" variable is set to false, the process continues at step 1032, where it is determined if a recording is currently in progress. If not, the process ends, otherwise the process continues with step 1034 where the current recording is ended, and the process ends.

Figure 11:
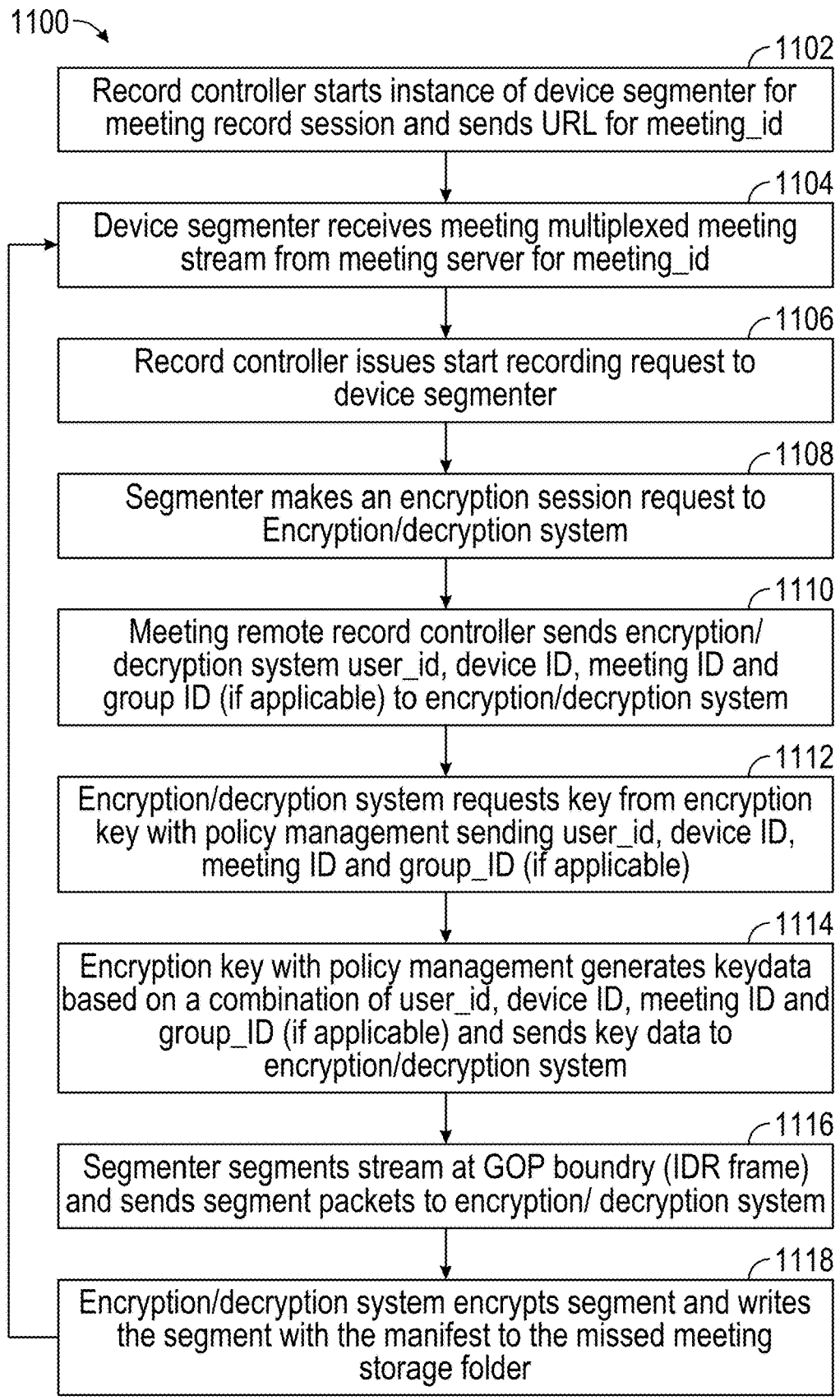
FIG. 11 is a flowchart of a method for recording and encrypting a virtual meeting, in accordance with some embodiments of the present disclosure.

FIG. 11 is a flowchart of a method 1100 for recording and encrypting a virtual meeting, in accordance with some embodiments of the present disclosure. At step 1102 a record controller begins an instance of a device segmenter to record a virtual meeting session and transmits a URL link for the virtual meeting.

At step 1104 a virtual meeting stream is received. In an embodiment, the stream is a multiplex stream that includes audio and video. In a further embodiment, the video and/or audio stream is a single stream. At step 1106 a recording request is transmitted, e.g., by the record controller to a device segmenter. At step 1108, an encryption session request is transmitted and at step 1110 variables related to the encryption request, such as an encryption/decryption system user ID, a device ID, a meeting ID, a group ID, and the like, are transmitted. At step 1112, an encryption key is requested based on the variables and at step 1114 key data related to the encryption request is generated. At step 1116 a GOP boundary of a video and/or audio stream is segmented and transmitted to an encryption/decryption system and at step 1118, a virtual meeting segment is encrypted and stored with a manifest tile to a storage folder.

It will be apparent to those of ordinary skill in the art that methods involved in the above-mentioned embodiments may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   determining a user availability status of a user at a computing device during a portion of a virtual meeting based at least in part on a user availability indicator of the user, the computing device connected via a network to a meeting service provider comprising a server providing the virtual meeting, wherein the user availability status is based at least in part on a detected scheduling conflict of the virtual meeting overlapping with a different meeting;

recording the portion of the virtual meeting based at least in part on determining that the user availability status indicates that the user is currently unavailable, wherein the portion of the virtual meeting is received at the computing device from the meeting service provider as a single stream without requiring demultiplexing by at least one of the computing device or an application that enables the computing device to access the virtual meeting; and ending the recording of the portion of the virtual meeting based at least in part on determining that the user availability status indicates that the user is currently available.

2. The computer-implemented method of claim 1, wherein the user availability indicator further comprises a user attention status determined based at least in part on at least one of (a) one or more sensors of the computing device, or (b) one or more sensors of a connected user device.

3. The computer-implemented method of claim 2, wherein the one or more sensors of the computing device and the one or more sensors of a connected user device include at least one of: a webcam, an infrared camera, a microphone, a Bluetooth module, a Wi-Fi module, or a proximity detector.

4. The computer-implemented method of claim 1, wherein the user availability status is based at least in part on each of: a user calendar availability, a user attendance status in the virtual meeting, a user attendance status in a sub-group of the virtual meeting, a determination of sufficient user eye contact characterized by a user looking at a display presenting the virtual meeting, and a user device network connection status.

5. The computer-implemented method of claim 1, wherein the recorded portion of the virtual meeting comprises an audio recording and a video recording.

6. The computer-implemented method of claim 5, further comprising:
performing a speech to text transcription on the audio recording to generate a text transcript of the portion of a virtual meeting; and
displaying the text transcript on a user device.

7. The computer-implemented method of claim 1, further comprising:
displaying the recording of the portion of the virtual meeting on a user device, wherein a playback speed of the displayed recording of the portion of the virtual meeting is different than an original recording playback speed.

8. The computer-implemented method of claim 1, further comprising:
monitoring a strength of a wireless audio connection between an audio device and the computing device;
determining, based at least in part on the monitoring, that the strength of the wireless audio connection is below a predetermined threshold; and
commencing recording, at the server, of the virtual meeting based at least in part on the determining.

9. The computer-implemented method of claim 1, further comprising:
determining a bandwidth corresponding to one or more of an audio stream or a video stream of the virtual meeting is below a predetermined threshold; and
based at least in part on the determining, commencing recording of the virtual meeting.

10. The computer-implemented method of claim 1, wherein the user availability status is based at least in part on a determination of sufficient user eye contact characterized by detecting a user looking at a display presenting the virtual meeting.

11. A system comprising:
a memory; and
a control circuitry configured to:
determine a user availability status of a user at a computing device during a portion of a virtual meeting based at least in part on a user availability indicator of the user, the computing device connected via a network to a meeting service provider comprising a server providing the virtual meeting, wherein the user availability status is based at least in part on a detected scheduling conflict of the virtual meeting overlapping with a different meeting;
record, at the server, the portion of the virtual meeting based at least in part on determining that the user availability status indicates that the user is currently unavailable, wherein the portion of the virtual meeting is received at the computing device from the meeting service provider as a single stream without requiring demultiplexing by at least one of the computing device or an application that enables the computing device to access the virtual meeting; and
end the recording of the portion of the virtual meeting based at least in part on determining that the user availability status indicates that the user is currently available.

12. The system of claim 11, wherein the user availability indicator further comprises a user attention status determined based at least in part on at least one of (a) one or more sensors of the computing device, or (b) one or more sensors of a connected user device.

13. The system of claim 12, wherein the one or more sensors of the computing device and the one or more sensors of a connected user device include at least one of:
a webcam, an infrared camera, a microphone, a Bluetooth module, a Wi-Fi module, or a proximity detector.

14. The system of claim 11, wherein the user availability status is based at least in part on each of: a user calendar availability, a user attendance status in the virtual meeting, a user attendance status in a sub-group of the virtual meeting, a determination of sufficient user eye contact characterized by detecting a user looking at a display presenting the virtual meeting, and a user device network connection status.

15. The system of claim 11, wherein the recorded portion of the virtual meeting comprises an audio recording and a video recording.

16. The system of claim 15, wherein the control circuitry is further configured to:
perform a speech to text transcription on the audio recording to generate a text transcript of the portion of a virtual meeting; and
display the text transcript on a user device.

17. The system of claim 11, wherein the control circuitry is further configured to:
display the recording of the portion of the virtual meeting on a user device, wherein a playback speed of the displayed recording of the portion of the virtual meeting is different than an original recording playback speed.

18. The system of claim 11, wherein the control circuitry is further configured to:
monitor a strength of a wireless audio connection between an audio device and the computing device;

determine, based at least in part on the monitoring, that the strength of the wireless audio connection is below a predetermined threshold; and commence recording, at the server, of the virtual meeting based at least in part on the determining.

19. The system of claim 11, wherein the control circuitry is further configured to:

determine a bandwidth corresponding to one or more of an audio stream or a video stream of the virtual meeting is below a predetermined threshold; and based at least in part on the determining, commence recording of the virtual meeting.

20. The system of claim 11, wherein the user availability status is based at least in part on a determination of sufficient user eye contact characterized by detecting a user looking at a display presenting the virtual meeting.

* * * * *